United States Patent [19]

Cedergreen

[11] Patent Number: 5,018,788
[45] Date of Patent: May 28, 1991

[54] FOLDABLE SEAT

[75] Inventor: Steven D. Cedergreen, Seattle, Wash.

[73] Assignee: Tempress Incorporated, Seattle, Wash.

[21] Appl. No.: 448,000

[22] Filed: Dec. 8, 1989

[51] Int. Cl.$^5$ .............................................. B60N 2/02
[52] U.S. Cl. ............................... 297/378; 297/DIG. 2
[58] Field of Search ............... 297/378, 379, 380, 381, 297/454, 457, DIG. 2, 353, 354, 53, 54; 114/363

[56] References Cited

U.S. PATENT DOCUMENTS

| 4,105,245 | 8/1978 | Simons et al. | 297/379 |
| 4,521,052 | 6/1985 | Cone | 297/DIG. 2 |
| 4,871,209 | 10/1989 | Handelman | 297/378 |
| 4,881,776 | 11/1989 | Wang | 297/378 |
| 4,902,070 | 2/1990 | Casale et al. | 297/379 |

FOREIGN PATENT DOCUMENTS 86830  7/1981  Japan ........................... 297/DIG. 2

Primary Examiner—Kenneth J. Dorner
Assistant Examiner—James M. Gardner
Attorney, Agent, or Firm—Christensen, O'Connor, Johnson & Kindness

[57] ABSTRACT

A foldable seat that includes a back support hingedly attached to a seat member such that the back support can be folded from an upright, open position to a horizontal, closed position. The seat memner includes a shoulder for cooperating with the bottom of the back support to prevent the back support from deflecting or buckling and being displaced beyond the vertical position.

6 Claims, 3 Drawing Sheets

FOLDABLE SEAT

FIELD OF THE INVENTION

The present invention relates to foldable seats, particularly foldable seats of two piece construction made from weather resistant materials.

BACKGROUND OF THE INVENTION

Portable seats are popular with fisherman, sporting event patrons, concertgoers and other people who have suffered through the discomfort of sitting for extended periods of benches without support for their back. There are a variety of portable seats that have been designed for specific activities. For instance, stadium seats normally are cushioned and may or may not be made from materials that are resistant to moisture and deterioration from sunlight. Seats used by fisherman have been made from materials, such as plastics that are resistant to moisture as well as deterioration from sunlight. In many uses of portable seats, it is quite common for the person using the seat to lean back on the seat with a force that is greater than normally encountered by the seat back when it is supporting a person who is seated in a normal upright position. In these instances, for the safety of the person seated in the portable seat and for those seated around this person, particularly those seated behind the person, it is important that the back of the seat not buckle or deflect from an upright position when leaned upon. If the back of the seat buckles or deflects from an upright position, it is likely that the seated person will fall backwards off the seat, possibly injuring his back or head injuring people seated nearby. If the seated person happens to be fishing on a small craft or near the edges of a larger craft, when they fall off the seat, they may fall off the craft or cause other people on the craft to lose their balance and fall overboard.

Accordingly, it is desirable to provide a portable seat that has a seat back that will not buckle or deflect from an upright position when the seated person leans forcibly back on the seat back. The seat should be designed so it can be manufactured easily from relatively inexpensive materials. In addition, lightweight construction, weather resistance, and compact size are desirable characteristics of a portable seat.

SUMMARY OF THE INVENTION

A seat formed in accordance with the present invention is designed so that it will not buckle or deflect when the person seated therein leans back and exerts force on the upright back support of the seat. The seat includes a simple design that can be manufactured easily from inexpensive, weather-resistant materials. The seat includes a means for preventing the seat back from buckling deflecting past the vertical upright position, which often results in the seated person falling backward off of the seat. Since the seat can be made from materials that are weather resistant, it is particularly useful to fishermen on boats where leaning on the seat back is quite common and the potential for injury when one falls off the seat is great.

A seat formed in accordance with the present invention includes a seat member and a back member that are hingedly attached together. The seat member can be fixedly attached to a support that holds the seat member in a substantially horizontal position. The back member is displaceable between a horizontal folded and a vertical unfolded position. The back member and the seat member each include an outwardly extending rib positioned proximate the point where the back member and seat member are hinged together. These ribs bear against each other once the back member is unfolded into the vertical position. The cooperation between these ribs serves at least in part to restrict the displacement of the back member past the vertical position. Additionally, the seat member includes a vertical back wall that carries a shoulder. The shoulder protrudes from the inner surface of the back wall, such that when the back member is in the vertical position, the bottom of the back member bears against the top of the shoulder. Accordingly, the shoulder serves as a stop for the bottom of the back member and prevents a force exerted upon the back member from causing the ribs on the back member and the seat member to come out of alignment and thus, allow the back member to be displaced past the vertical position.

Other objects, features, and advantages of the present invention will be readily apparent from the following description of certain preferred embodiments thereof, taken in conjunction with the accompanying drawings. It is understood that variations and modifications may be affected without departing from the spirit and scope of the novel concepts of the disclosure.

DETAILED DESCRIPTION OF THE INVENTION

Figure 1:
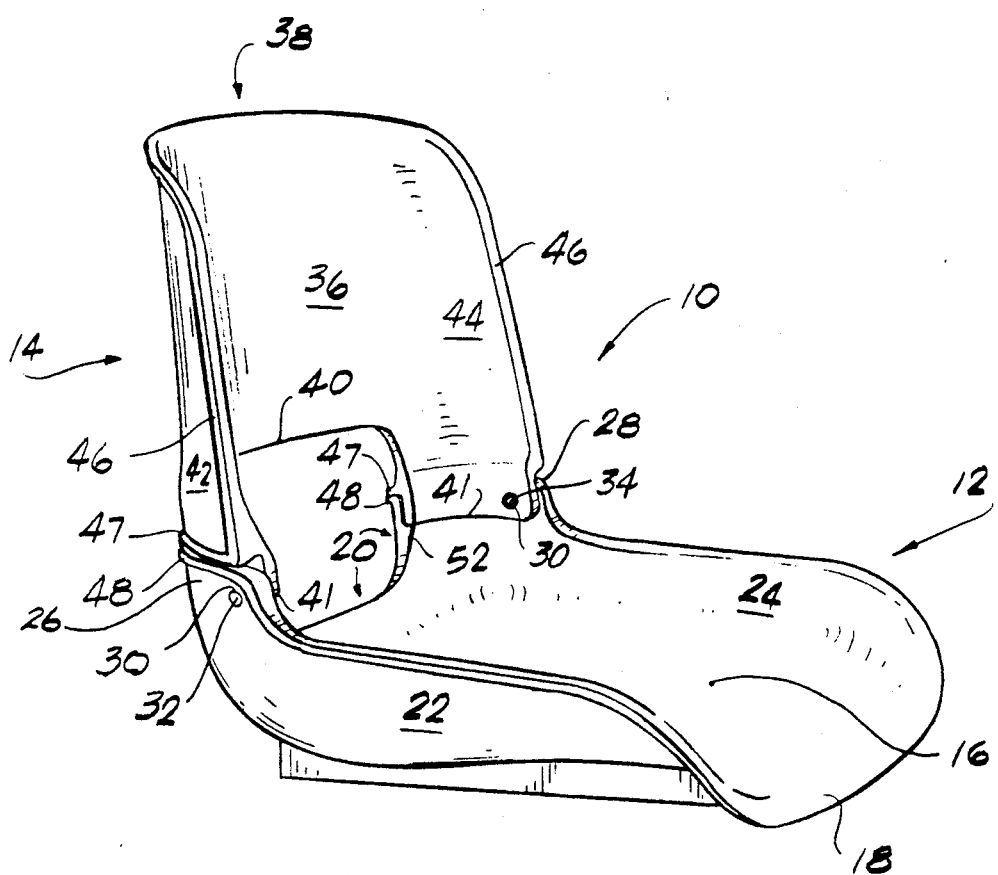
FIG. 1 is a perspective view of a seat formed in accordance with the present invention with the back member in a vertical position.

Referring to FIGS. 1, 2, 3, and 4, a seat indicated generally by reference numeral 10 formed in accordance with the present invention includes a generally horizontal seat member 12 and a back member 14 displaceable between an upright unfolded position and a horizontal folded position. Seat member 12 includes a horizontal seat surface 16 having a downwardly extending front end 18 and an upwardly extending back wall 20. The left and right edges of seat member 12 include upwardly extending left side wall 22 and right side wall 24. The distance that each side wall 22 and 24 extends above seat surface 16 increases from the front of seat surface 16 to the rear of seat surface 16. Side walls 22 and 24 are generally perpendicular to seat surface 16. The transition from left and right side walls 22 and 24 to seat surface 16 forms a generally smooth arcuate surface.

Figure 5:
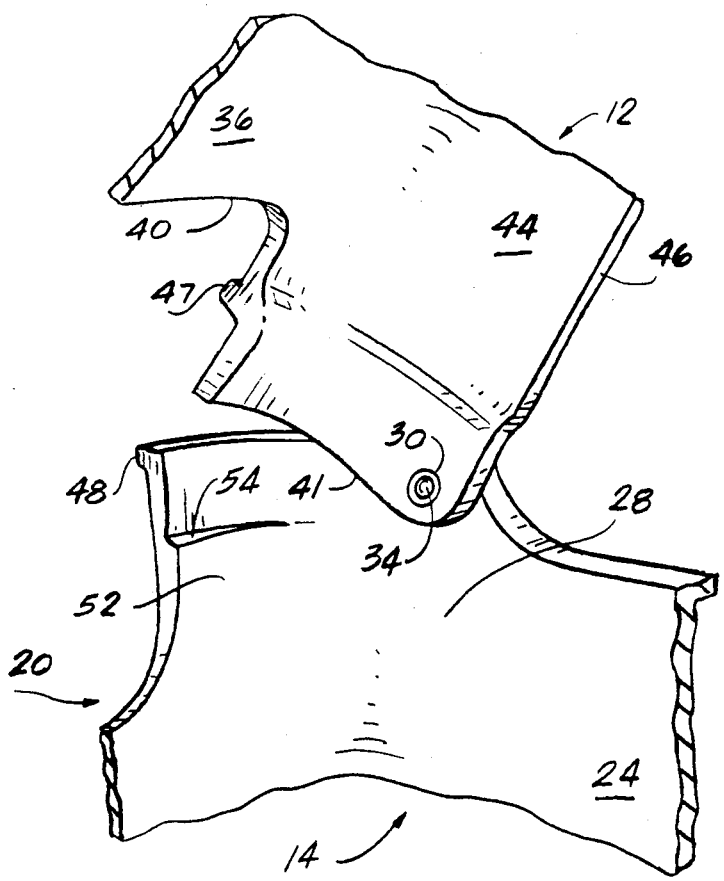
FIG. 5 is a perspecitve view of a portion of FIG. 4 with the seat back partially folded down.

Referring additionally to FIG. 5, the rear of vertical side walls 22 and 24 directly adjacent to upwardly extending back wall 20 each include vertically extending mounting flanges 26 and 28. Flanges 26 and 28 are taller than side walls 22 and 24 and extend upward to a height substantially equal to the height of the left and right sides of back wall 20. The rear ends of flanges 26 and 28 meet with the elevated left and right sides of upwardly extending back wall 20 to form a smooth arcuate transition surface. Flanges 26 and 28 lie in the same plane as vertical side walls 22 and 24, and form an approximately 90° angle with back wall 20. Below the top of each flange 26 and 28 is an aperture 30 for receiving left and right hinge pins 32 and 34, respectively, that hingedly attach seat member 12 to back member 14, as described hereinbelow in more detail.

The middle portion of back wall 20 includes a section that has a height less than the height of the left and right sides of back wall 20. This provides a cut-out portion between the left and right side walls of back wall 20.

Back member 14 includes a back support surface 36 that has an upper end 38 and a lower end 40. Left and right sides of back support surface 36 are bounded respectively by left and right side walls 42 and 44 that extend forwardly in a direction approximately perpendicular to back support surface 36 when back member 14 is in a vertical position. The distance side walls 42 and 44 extend forwardly from back support surface 36 increases from upper end 38 to lower end 40 of back support surface 36. Only the middle section of the lower end of back support surface 36 extends down to lower end 40. The left and right sides of back support 36 extend below lower end 40 to lowermost end 41. This provides a cutout between the left and right sides of back support surface 36 that coincides with the cutout in the upwardly extending back wall 20. For additional rigidity, upper end 38 and side walls 42 and 44 preferably include an outwardly extending rib 46.

Left and right side walls 42 and 44 extend down to lowermost end 41. Just above lowermost end 41, left and right side walls 42 and 44 each include an aperture 43 for receiving hinge pins 32 and 34 that serve to hingedly attach back member 14 to seat member 12. When seat member 12 is fixed horizontally, back member 14 can be folded from an upright vertical position to a folded, horizontal position, or vice versa.

Above lowermost end 41 of the left and right sides of back support surface 36 and left and right side walls 42 and 44, and below lower end 40 is a rib 47. Rib 47 is carried by the back of left and right sides of back support surface 36 and the outer surface of left and right side walls 42 and 44.

Rib 47 is positioned such that when back member 14 is in an upright position, the bottom of rib 47 bears against the top of a rib 48 that is described in more detail below. Preferably, rib 47 is about 1.0 inches above lowermost end 41 of back member 14. When rib 48 bears on rib 47, back member 14 is restrained from rotating past a substantially vertical position. Applicant has found that, although the abutment of ribs 47 and 48 is sufficient to prevent back member 14 from rotating past the vertical position under normal load conditions, if the user leans back with enough force, the ribs can be deflected out of alignment with each other, and seat back 14 will rotate beyond vertical. When back member 14 does this, the seated person can easily fall backwards out of the seat.

Figure 2:
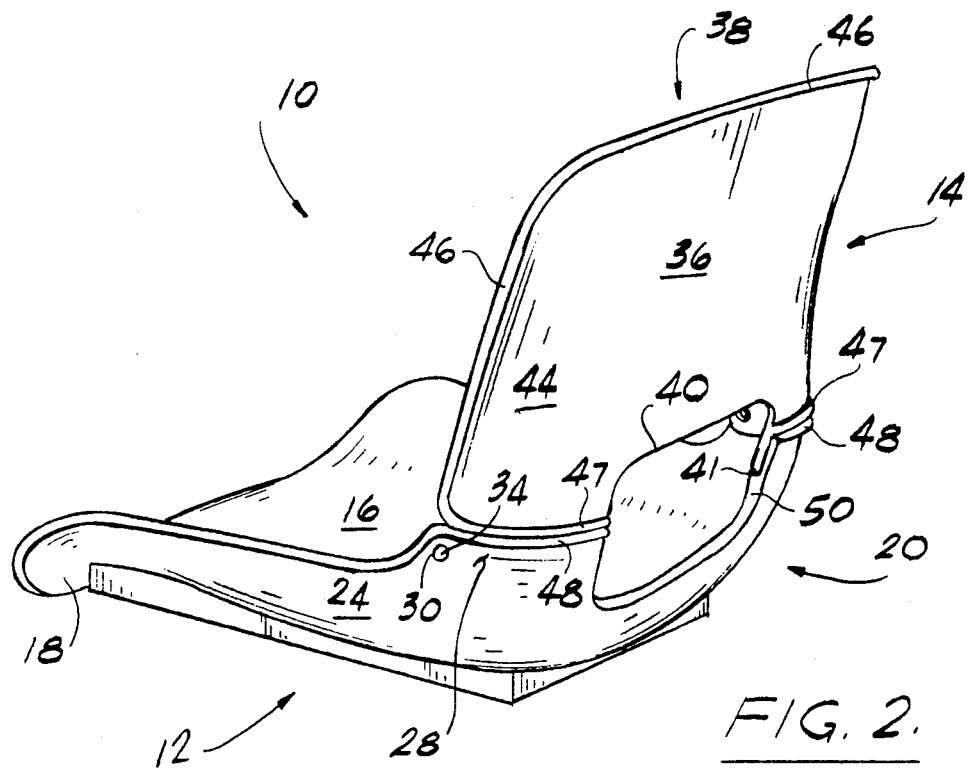
FIG. 2 is a perspective view of the rear of the seat in FIG. 1.
Figure 4:
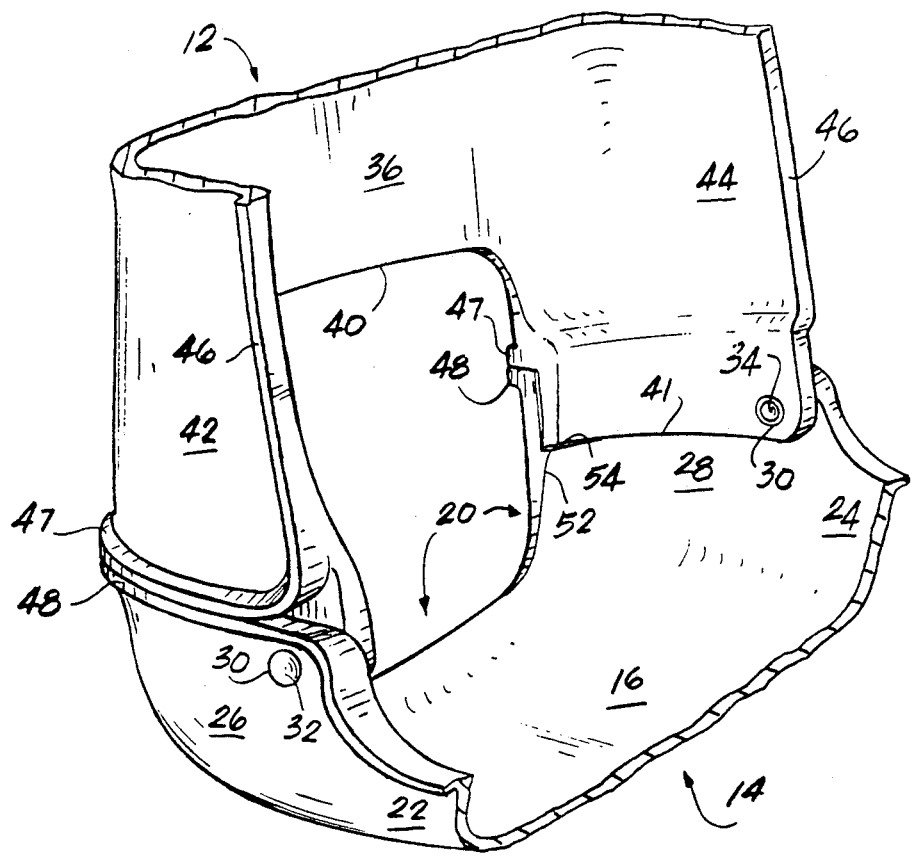
FIG. 4 is an enlarged view of a portion of the seat in FIG. 1.

The top of the left and right sides of upwardly extending back wall 20 and the top of flanges 26 and 28 include rearwardly and outwardly extending rib 48 that has a substantially horizontal upper surface. As illustrated in FIGS. 2 and 4, when back member 14 is in a vertical unfolded position, the horizontal surface of rib 47 coincides and bears against horizontal surface of rib 48, thus restricting the displacement of back member rearward past the vertical position.

Referring to FIGS. 1 through 5, on the inner surface of upwardly extending back wall 20 of seat member 12 are inwardly protruding left and right shoulders 50 and 52 that each include a horizontal upper surface 54. Shoulder 52 is not illustrated in FIGS. 2 and 3, but it is substantially a mirror image of shoulder 50 illustrated in detail in FIG. 5. Shoulders 50 and 52 are positioned approximately halfway up the left and right sides of upwardly extending back wall 20 between the cut-out portion described above and left and right flanges 26 and 28. Preferably, upper surface 54 of shoulders 50 and 52 are a distance below the upper surface of rib 48 equal to the distance between the lower surface of rib 47 and the lowermost end 41 of back support surface 36. In accordance with a preferred embodiment, the upper surface 54 of shoulders 50 and 52 is about 1.0 inch below the upper surface of rib 48.

As described briefly above, left and right sides of back support surfaces 36 continue to extend downward below rib 47 and end at lowermost end 41. Lowermost end 41 substantially coincides with top surface 54 of shoulders 50 and 52 when back member 14 is in an upright position. Accordingly, in addition to the lower surface of rib 47 and the upper surface of rib 48 bearing against each other and restricting back member 14 from deflecting or bucking so that back member 14 can rotate past a substantially vertical position, applicant has found that the cooperation between upper surface 54 of shoulders 50 and 52 bearing against lowermost end 41 of back member 14 reduces the likelihood that the cooperation between rib 47 and rib 48 will fail and prevents back member 14 from rotating past the vertical position should this cooperation fail.

Figure 3:
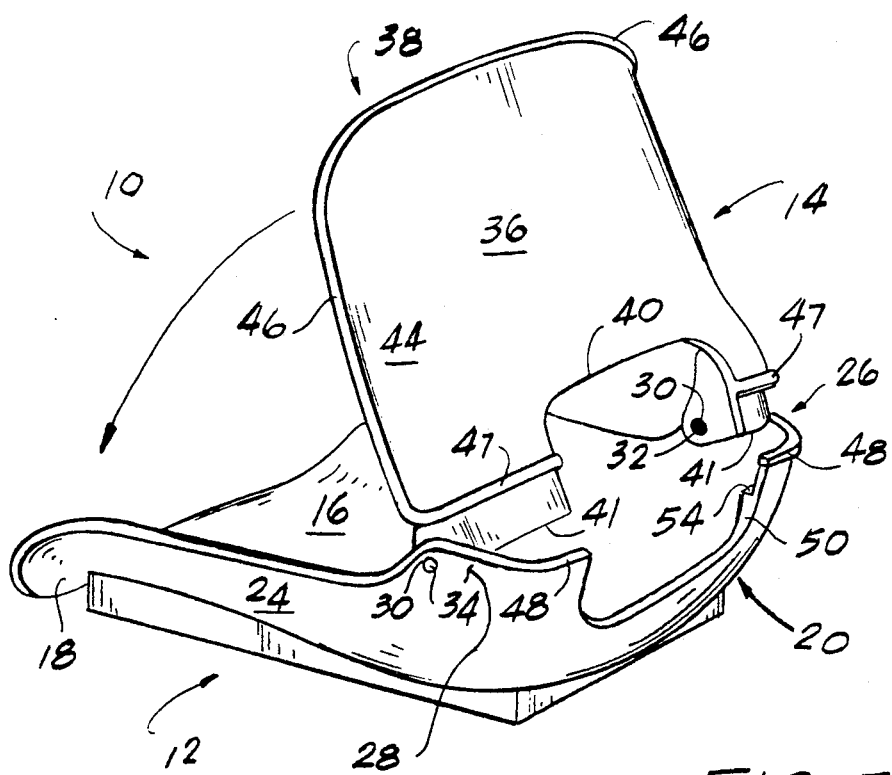
FIG. 3 is a perspective view of the seat in FIG. 2 with the seat back partially folded down.

Referring specifically to FIGS. 3 and 5, the relative alignment of left and right side walls 42 and 44, the left and right sides of back support 36 between lowermost end 41 and rib 47 with left and right flanges 26 and 28, the left and right sides of back wall 20 between rib 48 and shoulders 50 and 52 is such that when back member 14 if folded down, the lower portion of back member 14 swings free of the upper portion of flanges 26 and 28 and back wall 20, allowng seat 10 to be folded into a compact size and shape.

When seats formed in accordance with the present invention are to be used outside, it is preferred that the seat be molded from impact-resistant and weather-resistant thermoplastic or thermoset polymers. The seats can be manufactured by conventional molding techniques such as injection molding or casting. One of ordinary skill, after reading the foregoing specification, will be able to effect various changes, substitutions of equivalents, and other alterations without departing from the broad concepts disclosed herein. It is therefore intended that the scope of Letters Patent granted hereon will be limited only by the definition contained in the appended claims and equivalents thereof.

The embodiments of the invention in which an exclusive property or privileged is claimed are defined as follows:

1. A seat comprising a seat member having a front edge, an uppermost rear edge, a lower rear edge, and a back member, said back member hingedly attached to said seat member and displaceable between a horizontal folded and a vertical unfolded position, said seat member including a vertical back having a forward facing surface including a frontward extending shoulder positioned intermediate the uppermost rear edge and said lower rear edge, said shoulder having an upper, substantially horizontal surface bearing against the bottom of said back member when said back member is in said vertical position.

2. The seat of claim 1, wherein said seat member further includes vertical left and right side walls and a horizontal seat surface, said back member including left and right side walls separated by a back support, a first rib extending outward from said side walls and said back wall of said seat member, a second rib extending outward from said side walls and said back support of said back member, at least a portion of said first rib and said second rib bearing on each other when said back member is in the vertical unfolded position and restricting the displacement of said back member.

3. The seat of claim 2, wherein said second rib extends around a portion of said left and right side walls and a portion of said back support.

4. The seat of claim 2, wherein said second rib is spaced about 1.0 inch above the bottom of said back member.

5. The seat of claim 2, wherein said first rib is spaced about 1.0 inch above said upper substantially horizontal surface of said shoulder.

6. A seat comprising a seat member having a front edge, a rear edge and a back member, said back member hingedly attached to said seat member and displaceable between a horizontal folded and a vertical unfolded position, said seat member including a vertical back wall along the rear edge, vertical left and right side walls, and a horizontal seat surface, said back member including left and right side walls separated by a back support, a first rib extending outward from said side walls and rearward from said back wall of said seat member and having a substantially horizontal contact surface, a second rib extending outward from said side walls and rearward from said back support of said back member when said back member is in the vertical unfolded position, said second rib having a substantially horizontal contact surface when the back member is in the vertical unfolded position, at least a portion of said horizontal contact surface of said first rib and said horizontal contact surface of said second rib bearing on each other when said back member is in the vertical unfolded position and restricting the displacement of said back member, a surface of said back wall of said seat member facing the front edge including a frontward extending shoulder, said shoulder having an upper surface for bearing against the bottom of said back member when said back member is in the vertical position.

* * * * *

UNITED STATES PATENT AND TRADEMARK OFFICE
CERTIFICATE OF CORRECTION

PATENT NO. : 5,018,788
DATED : May 28, 1991
INVENTOR(S) : S. D. Cedergreen It is certified that error appears in the above-identified patent and that said Letters Patent is hereby corrected as shown below:

| Column | Line | |
|---|---|---|
| 57 (Abstract) | 5 | "memner" should be --member-- |
| 1 | 16 | Delete "be" (second occurrence) |
| 1 | 18 | "fisherman" should be --fishermen-- |
| 1 | 56 | After "buckling" insert --or-- |
| 2 | 39 | "perspecitve" should be --perspective-- |
| 4 | 42 | "allowng" should be --allowing-- |
| 4 | 58 | "priveleged" should be --privileged-- |

Signed and Sealed this

Fifth Day of January, 1993

Attest:

DOUGLAS B. COMER

*Attesting Officer*    *Acting Commissioner of Patents and Trademarks*